United States Patent [19]

Rich

[11] 4,321,349

[45] * Mar. 23, 1982

[54] ACCELERATOR FOR CURABLE COMPOSITIONS

[75] Inventor: Richard D. Rich, Avon, Conn.

[73] Assignee: Loctite Corporation, Newington, Conn.

[*] Notice: The portion of the term of this patent subsequent to Sep. 1, 1998, has been disclaimed.

[21] Appl. No.: 153,473

[22] Filed: May 27, 1980

Related U.S. Application Data

[62] Division of Ser. No. 580,267, May 23, 1975, Pat. No. 4,287,330.

[51] Int. Cl.$^3$ .................. C08F 24/00; C08F 18/20; C08F 26/02
[52] U.S. Cl. .................. 526/270; 526/205; 526/215; 526/219; 526/230; 526/301; 526/302; 526/320; 526/321; 526/328

[58] Field of Search .............. 526/219, 301, 302, 320, 526/321, 292, 328, 215, 270

[56] References Cited

U.S. PATENT DOCUMENTS

| | | | |
|---|---|---|---|
| 3,425,988 | 2/1969 | Gorman et al. | 260/31.2 N |
| 3,491,076 | 1/1970 | Bachman | 260/31.8 R |
| 4,180,640 | 12/1979 | Melody et al. | 526/301 |

Primary Examiner—Herbert J. Lilling
Attorney, Agent, or Firm—Jean B. Mauro; Daniel A. Scola, Jr.; Eugene F. Miller

[57] ABSTRACT

Curable acrylate ester compositions having as an accelerator for the polymerization a hydrazine derivative of the formula $R^1$—HN—NH—CO—$R^2$. Typical of the monomers are the polyalkyleneglycol dimethacrylates and the so-called urethane acrylates. Polymerization is preferably initiated by a peroxy compound such as cumene hydroperoxide, such a composition having anaerobic curing characteristics.

16 Claims, No Drawings

ACCELERATOR FOR CURABLE COMPOSITIONS

This is a division, of application Ser. No. 580,267 filed May 23, 1975, now U.S. Pat. No. 4,287,330.

BACKGROUND OF THE INVENTION

1. Field of the Invention

This invention relates to a new accelerator for the cure of adhesive and sealant compositions, preferably, anaerobic compositions, i.e., those polymerizable compositions which remain liquid in the presence of air but which polymerize upon exclusion of air, as between closely fitting metal surfaces.

2. Description of the Prior Art

Anaerobic adhesive and sealant compositions are well known in the art. See, for example, U.S. Pat. Nos. 2,895,950, 3,043,820 and 3,218,306, among others. According to these references, anaerobic compositions may be described in general terms as free radical polymerizable acrylate ester monomers (e.g., polyethylene glycol dimethacrylate, and urethane-acrylates (e.g., U.S. Pat. No. 3,425,988) derived according to known urethane chemistry), in combination with a peroxy initiator and usually one or more inhibitors to enhance stability. Preferably, such compositions also contain one or more accelerators of free radical polymerization, which are typically amines, amides or imides (e.g., benzoic sulfimide). The accelerators are quite important since they greatly increase the cure speed of the adhesive or sealant composition. Extensive research is continually devoted to seeking accelerators which are not subject to a variety of problems, such as, losing effectiveness upon long-term storage of the composition, or destabilizing the composition, among others.

Among the more recent accelerators disclosed in the art are those of U.S. Pat. No. 3,491,076 to Bachman. This patent relates to rhodanine and organic hydrazides having the structure:

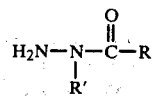

wherein R may be hydrogen, alkyl, cycloalkyl, aryl and alkoxy, and R' may be hydrogen, alkyl, cycloalkyl, acyl and dithiocarbonyl. R and R' may also be connected in a ring structure such as N-aminorhodanine. While the Bachman accelerators do possess utility, they are not fully satisfactory in various respects, e.g., stability of adhesive formulations, retention of cure speed and lesser initial speed.

SUMMARY OF THE INVENTION

According to the present invention, there is provided a curable adhesive and/or sealant composition, preferably having anaerobic curing characteristics, comprising one or more room temperature polymerizable acrylate esters, a free radical initiator in an amount sufficient to initiate polymerization of said esters and, as a polymerization accelerator, a compound having the formula

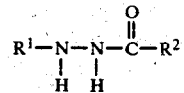

wherein $R^1$ is selected from the group consisting of alkyl, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl, amino, and the following groups:

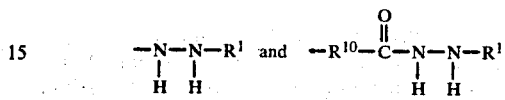

wherein $R^{10}$ is selected from the group consisting of alkyl groups containing one to about 10 carbon atoms, alkenyl groups containing two to about 10 carbon atoms, and aryl groups containing up to about 10 carbon atoms. Said accelerators should be present in an amount sufficient to accelerate the polymerization at room temperature.

These accelerators may be used singly or may be mixed, as desired. Moreover, other materials known to the art as accelerators may optionally be included as co-accelerators.

Compositions containing these accelerators have good cure speed, which is retained upon storage for extended periods, and have excellent storage stability.

The invention also relates to a process of adhering or sealing surfaces, especially closely-fitting mating surfaces, comprising applying to at least one of said surfaces an adhesive/sealant composition of this invention, placing said surfaces in abutting relationship, and allowing the composition to cure. Similarly, the invention extends to a structure adhesively assembled using a composition of this invention.

DETAILED DESCRIPTION OF THE INVENTION

This invention relates to certain compounds having the formula

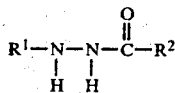

where $R^1$ and $R^2$ (referred to collectively as "R groups") are as defined above, which compounds have been found to be useful as accelerators for the cure (i.e., polymerization) of certain adhesive and/or sealant compositions, as will be discussed more fully below. The accelerator should be soluble, at least in part, in the polymerizable acrylate ester or in a material which is also a mutual solvent for the acrylate ester.

$R^1$ may be selected from the following radicals: alkyl, preferably lower alkyl containing 1-6 carbon atoms, either straight chain or branched, more preferably methyl, ethyl or isopropyl; cycloalkyl containing up to about 8 carbon atoms; alkenyl containing up to about 10, preferably 2-5, carbon atoms; cycloalkenyl containing up to 10, preferably up to about 6, carbon atoms; aryl, including halo-substituted aryl, hydroxy-substituted aryl, nitro-substituted aryl, and aryl substituted by lower alkyl or alkoxy groups containing one to about 6 carbon atoms. $R^2$ may be hydrogen or any one of the radicals specified for $R^1$ and in addition may be an amino or substituted amino group, or a carbonyl group to which is connected an unreactive group such as a lower alkyl containing from one to about 4 carbon atoms. $R^2$ may also be either of the following groups:

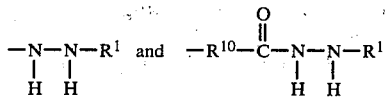

wherein $R^{10}$ is selected from the group consisting of alkyl groups containing one to about 10 carbon atoms, alkenyl groups containing two to about 10 carbon atoms, and aryl groups containing up to about 10 carbon atoms.

Representative compounds according to the above formula include, but are not limited to, 1-acetyl-2-phenyl hydrazine, 1-acetyl-2(p-tolyl) hydrazine, 1-benzoyl-2-phenyl hydrazine, 1-(1',1',1'-trifluoro)acetyl-2-phenyl hydrazine, 1,5-diphenylcarbohydrazide, 1-formyl-2-phenyl hydrazine, 1-acetyl-2-(p-bromophenyl) hydrazine, 1-acetyl-2-(p-nitrophenyl) hydrazine, 1-acetyl-2-(p-methoxyphenyl) hydrazine, 1-acetyl-2-(2'-phenylethyl) hydrazine, 1-acetyl-2-methyl hydrazine, 1-phenylsemicarbazide, 2-phenyl-t-butylcarbazate, and succinic acid di(phenylhydrazide).

Efficacy of the accelerators of this invention appears to require the presence of a proton on each of the nitrogen atoms, but no more than one proton on each nitrogen atom. If this criterion is met, the precise nature of the R groups does not appear to be critical, provided, of course, that the R groups may not be selected so as to interfere substantially with the storage properties of the adhesive composition or with the performance of the accelerator for its intended purpose. Thus, the selection of specific R groups and combinations thereof is deemed to be a matter of experimentation and choice. It will, of course, be appreciated by those skilled in the art that optimum selection of R groups may depend upon the curable ester monomer or mixture of monomers, as well as the initiator or optional co-accelerator used.

The accelerators of this invention may be used in adhesive and sealant compositions in concentrations from about 0.001 to about 10 percent or more by weight based on the total composition. Below this lower limit, little effect will be observed. The upper limit is not critical since significant improvement usually will not be found above concentrations of about 5% by weight. As a practical matter, a concentration range of 0.1-2.0% by weight will provide optimum over-all benefit and this range is therefore especially preferred.

The accelerators of this invention appear to have broad utility in free radical curable acrylate ester systems in general. Their use is especially preferred in conjunction with anaerobic curing systems and the acrylate ester monomers used in such systems. While a variety of such monomers is known to the art and useful in this invention, the especially preferred monomers will now be described. The first of these are the polyacrylate esters represented by the formula

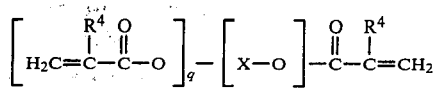

wherein $R^4$ is a radical selected from the group consisting of hydrogen, halogen and alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, preferably 30, and most preferably about 20.

For example, X can be an organic radical of the formula

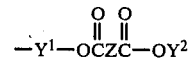

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms.

Other classes of useful monomers are the reaction products of di- or tri-alkylolamines (e.g., ethanolamines or propanolamines) with acrylic acids, such as are disclosed in French Patent No. 1,581,361.

Highly preferred are polyacrylate esters which have the following general formula:

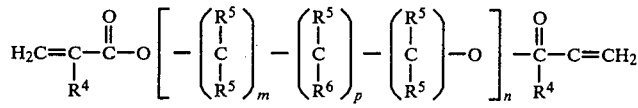

wherein $R^5$ represents a radical selected from the group consisting of hydrogen, lower alkyl of from 1 to about 4 carbon atoms, hydroxy alkyl of from 1 to about 4 carbon atoms, and

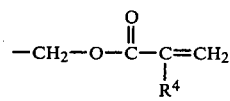

$R^4$ is a radical selected from the group consisting of hydrogen, halogen, and lower alkyl of from 1 to about 4 carbon atoms; $R^6$ is a radical selected from the group consisting of hydrogen, hydroxyl, and

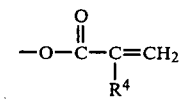

m is an integer equal to at least 1, e.g., from 1 to about 15 or higher, and preferably from 1 to about 8; n is an integer equal to at least 1, e.g., 1 to about 40 or more, and preferably between about 2 and about 10; and p is 0 or 1.

Typical examples of polyacrylate esters corresponding to the above general formula are di-, tri- and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from the group consisting of labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another preferred class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureide groups. The monofunctional alkyl and aryl acrylate esters are preferably the acrylates and methacrylates containing hydroxy or amino functional groups on the nonacrylate portion thereof. Acrylate esters suitable for use have the formula

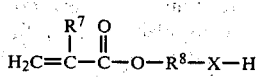

wherein X is selected from the group consisting of —O— and

and $R^9$ is selected from the group consisting of hydrogen and lower alkyl of 1 through 7 carbon atoms; $R^7$ is selected from the class consisting of hydrogen, chlorine and methyl and ethyl radicals; and $R^8$ is a divalent organic radical selected from the group consisting of lower alkylene of 1 through 8 carbon atoms, phenylene and naphthylene. These groups, upon proper reaction with a polyisocyanate, yield a sealant monomer of the following general formula:

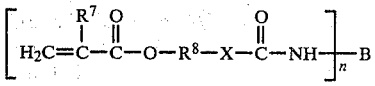

wherein n is an integer from 2 to about 6; B is a polyvalent organic radical selected from the group consisting of alkyl, alkenyl, cycloalkyl, cycloalkenyl, aryl, aralkyl, alkaryl and heterocyclic radicals both substituted and unsubstituted; and $R^7 R^8$ and X have the meanings given above.

The hydroxy- and amine-containing materials suitable for use in the preparation of the above monomeric products are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the like.

The preferred organic polyisocyanates comprise the higher alkenyl diisocyanates, the cycloalkenyl diisocyanates and the aromatic diisocyanates containing 8 or more carbon atoms and preferably from 8 to about 30 carbon atoms, such as, for example, octamethylene diisocyanate, durene diisocyanate, 4,4'-diphenyldiisocyanate, and toluene diisocyanate.

The proportions in which the reactants may be combined can be varied somewhat; however, it is generally preferred to employ the reactants in chemically equivalent amounts up to a slight excess, e.g., 1 equivalent excess of the polyisocyanate. As used herein the expression "chemically equivalent amount" refers to the amount needed to furnish one isocyanate group per hydroxy or amino group.

The reaction may be accomplished in the presence or absence of diluents. Preferably diluents which include the hydrocarbons, such as aliphatic, cycloaliphatic and aromatic hydrocarbons, for example, benzene, toluene, cyclohexane, hexane, heptane and the like, are employed but other diluents, such as methyl isobutyl ketone, diamyl ketone, isobutyl methacrylate, triethyleneglycol dimethacrylate, and cyclohexyl methacrylate can also be beneficially utilized, if desired, especially where complete compatibility with the sealant system is desired.

The temperature employed in the reaction may also vary over a wide range. Where the components are combined in approximately chemical equivalent amounts or with slight excess of the isocyanate reactant, useful temperatures may vary from room temperature or below, e.g., 10° C. to 15° C., up to and including temperatures of 100° C. to 175° C. Where reacting the simpler isocyanates, the components are preferably combined at or near room temperature, such as temperatures ranging from 20° C. to 30° C. In the preparation of the high molecular weight isocyanate adducts using an excess of the isocyanate, the reactions may be combined at room temperature or preferably heated at temperatures ranging from about 40° C. to about 150° C. Reactions conducted at about 90° C. to 120° C. have been found to proceed quite smoothly.

The monomers of this invention cure via a free radical mechanism. Typical of the useful initiators are any of a wide variety of known peroxy initiators. Illustrative of such initiators are the diacyl peroxides such as benzoyl peroxide; dialkyl peroxides such as di-tert.-butyl peroxide; ketone peroxides such as methylethyl ketone peroxide; and peresters which readily hydrolyze, e.g., tert.-butyl peracetate, tert.-butyl perbenzoate, di-tert.-butyl diperphthalate, etc. A particularly useful class of peroxy initiators are the organic hydroperoxides such as cumene hydroperoxide, methylethyl ketone hydroperoxide, tert.-butyl hydroperoxide, etc. Of these, cumene hydroperoxide is especially preferred. The initiators should be used at a concentration of about 0.01 percent to about 10 percent by weight of the total formulation, preferably 0.1 percent to about 5 percent by weight. Another useful class of initiators comprises carbonyl-containing ultraviolet-activated free radical generators such as acetophenone, benzophenone, and the benzoin ethers. Suitable UV initiators are disclosed in copending application Ser. No. 356,679, filed May 2, 1973. Initiator mixtures may also be used.

The adhesive and sealant formulations of this invention may be prepared, if desired, with reactive diluents which are capable of copolymerizing with the monomers. Typical of such diluents are the hydroxyalkyl acrylates such as hydroxyethyl acrylate, hydroxypropyl acrylate, and the corresponding methacrylate compounds, including cyclohexyl methacrylate and tetrahydrofurfuryl methacrylate. Other unsaturated reactive diluents, such as styrene, acrylonitrile and diallyl phthalate, can also be used. When used, the concentration of such diluents should be less than about 60 percent by weight, and preferably about 40 to about 10 percent.

It will be understood that the curable composition of this invention can also be formulated as a two-part composition. In such a case, the initiator or one of a combination of initiators can comprise a second part which is combined with the first, monomeric, part at the point of use. Thus, the monomer can be applied to one surface to be joined, the initiator can be applied to a second surface, and the two surfaces then joined. Similarly, the accelerator can be applied separately as a second part to one of the surfaces to be joined, or may be combined with either the monomer or initiator parts.

On "inactive" surfaces (e.g., zinc or cadmium plated surfaces), or where unusually large gaps are involved, it may be desirable to utilize one of the various primers known to the art. Suitable primers are, e.g., those disclosed in U.S. Pat. No. 3,625,930 to Toback et al., and particularly those of the thiourea type disclosed in copending application Ser. No. 323,689, filed Jan. 15, 1973. Such primers are advantageously applied as a spray from dilute solvent solution to either or both surfaces to be joined.

The adhesive/sealant compositions of this invention may also contain one or more co-accelerators, which may be selected from various materials known to the art, and act in conjunction with the accelerators of this invention. Suitable co-accelerators include the organic amides and imides (of which benzoic sulfimide is a preferred example), and secondary and tertiary amines, such as are described in U.S. Pat. No. 3,218,305. Such co-accelerators, if used, may be present in quite small quantities, e.g., from a few parts per million up to about 5 percent by weight.

Other additives known to the art may also be employed, as needed. Commonly employed are polymerization inhibitors, such as those of the quinone type disclosed in U.S. Pat. No. 3,043,820. Of these, naphthoquinone is especially preferred. However, oxidizing inhibitors, such as benzoquinone, appear to be ineffective in improving stability and are preferably avoided, at least in concentrations above about 100 parts per million. Inhibitors are used in an amount sufficient to prevent premature polymerization of the composition, typically in concentrations of about 10–1,000 parts per million by weight. Also known are a wide variety of thickeners, plasticizers, dyes, etc., which may optionally be used in concentrations as desired, provided, of course, that they do not substantially interfere with the function of the instant accelerators for their intended purpose. Typical of these additions are the silica-based and castor oil-based thixotropic agents and plasticizers, and adhesion promoters such as those derived from silanes, e.g., the alkoxy silanes.

The following examples illustrate the present invention and are in no way limitations on it.

EXAMPLE 1

The following stock solution was prepared:

| | |
|---|---|
| Triethyleneglycol dimethacrylate | 200 parts |
| Cumene hydroperoxide | 6 parts |
| Benzoic sulfimide | 3.2 parts |
| Stabilizers | 2.4 parts |

The above stock solution was mixed with various accelerators of this invention in the proportion of 10 parts stock solution to 0.1 part accelerator. The mixtures were stirred for an hour or more until all of the accelerator compound was dissolved, thereby forming a complete adhesive composition having anaerobic curing characteristics.

An accelerated aging test was performed by placing samples of the adhesive composition in glass tubes in a water bath at 82° C. The tubes were checked frequently for gellation and the time at which gellation occurred was recorded. In this test a non-gellation period of about 60 minutes typically corresponds to a room temperature shelf life of about one year, and, of course, a longer non-gellation period is highly desirable.

Performance of the adhesive composition was measured by applying it to a glass slide and then placing a second glass slide on the first one so that about a one square inch overlap occured on the adhesive surface. The time was recorded at which the two glass slides could no longer be moved relative to each other by finger pressure. This is referred to as the "fixture" time.

In another performance test, several drops of adhesive composition were placed on the threads of a black oxide, ⅜-16 bolt and the mating nut was then wound on loosely to engage the threads containing the adhesive. After 15 minutes of cure time, two unwinding torque measurements were made: "break" strength—the torque required to cause the first relative motion between the nut and bolt; and "prevail" strength—the torque required to cause rotation of the nut 180° beyond the "break" point.

Results of these tests are shown in Table I.

TABLE I

| | TEST PROPERTIES | | |
|---|---|---|---|
| Accelerator | Stability 82° C. | Glass Fixture Time | Break/Prevail |
| 1-acetyl-2-phenyl hydrazine | more than 24 hrs. | 175 min. | 65/270 inch-lbs. |
| 1-formyl-2-phenyl hydrazine | 20 hrs. | 35 min. | 90/233 inch-lbs. |
| 1-acetyl-2(p-tolyl) hydrazine | 45 min. | 55 min. | 28/98 inch-lbs. |
| 1-acetyl-2(p-bromo- | more than | | |

TABLE I-continued

| Accelerator | TEST PROPERTIES | | |
|---|---|---|---|
| | Stability 82° C. | Glass Fixture Time | Break/Prevail |
| phenyl)hydrazine | 24 hrs. | 100 min. | 65/190 inch-lbs. |
| 1-acetyl-2(p-nitro-phenyl)hydrazine | more than 24 hrs. | 6 hrs. | 78/68 inch-lbs. |
| 1,5-diphenylcarbohydrazide | 85 min. | 30 min. | 70/223 inch-lbs. |
| control (no accelerator) | 20 min. | 8 hrs. | 0/0 inch-lbs. |

EXAMPLE 2

A curable acrylate ester resin was prepared as a reaction product of 2 moles of hydroxypropyl methacrylate with 1 mole of methylene bis-phenylisocyanate. This resin was made into a stock solution of the following composition:

| | |
|---|---|
| Resin | 29.5 parts |
| Triethyleneglycol dimethacrylate (co-monomer) | 9.8 parts |
| 2-hydroxypropyl methacrylate (reactive diluent) | 2.3 parts |
| Polyethyleneglycol dimethacrylate (reactive diluent) | 2.4 parts |
| Benzoic sulfimide | 0.5 parts |
| Cumene hydroperoxide | 1.5 parts |
| Acrylic acid (adhesion promoter) | 2.7 parts |
| Adhesive agents, stabilizers | 1.1 parts |

This stock solution was made into adhesive compositions by mixing 10 parts of the stock solution with 0.1 part of various accelerators of this invention for at least one hour at high speed with a spiral ribbon stirrer. The adhesive compositions had anaerobic curing properties.

Tests were performed as in Example 1 and the results are shown in Table II.

TABLE II

| Accelerator | TEST PROPERTIES | | |
|---|---|---|---|
| | Stability 82° C. | Fixture Time | Break/Prevail |
| 1-acetyl-2-phenyl hydrazine | 135 min. | 140 min. | 20/5 inch-lbs. |
| 1-formyl-2-phenyl hydrazine | 124 min. | 60 min. | 8/0 inch-lbs. |
| 1-acetyl-2(p-tolyl) hydrazine | 103 min. | 60 min. | 12/5 inch-lbs. |
| 1,5-diphenylcarbohydrazide | more than 24 hrs. | 24 hrs. | 12/5 inch-lbs. |
| Stock solution (control) | 67 min. | more than 24 hrs. | 0/0 inch-lbs. |

EXAMPLE 3

A series of compositions was prepared using the same curable acrylate resin described in Example 2. A stock solution of the following composition was prepared:

| | |
|---|---|
| Resin | 154.5 parts |
| Triethyleneglycol dimethacrylate | 51.5 parts |
| 2-hydroxypropyl methacrylate (reactive diluent) | 12.0 parts |
| Polyethyleneglycol dimethacrylate | 12.5 parts |
| Acrylic Acid (adhesive agent) | 15.5 parts |
| Stabilizers and adhesive agents | 5.5 parts |

50 parts of the above stock solution were mixed in varying proportions with the active curing components, cumene hydroperoxide, benzoic sulfimide and 1-acetyl-2-phenylhydrazine. These compositions were tested as in Example 1 and the following results were obtained:

TABLE III

| TEST PROPERTIES | | | | | |
|---|---|---|---|---|---|
| Parts per 50 parts stock solution | | | | | |
| 1-acetyl-2-phenyl-hydrazine | benzoic sulfimide | cumene hydroperoxide | Stability at 82° C. | Glass Fixture Time | Break/Prevail |
| 0 | 0.5 | 1.5 | 80 min. | 24 hrs. | 0/0 inch-lbs. |
| 0 | 0.25 | 0.75 | 220 min. | 24 hrs. | 0/0 inch-lbs. |
| 0.25 | 0 | 1.5 | 190 min. | 24 hrs. | 48/12 inch-lbs. |
| 0.25 | 0.5 | 0.75 | 13 hrs. | 3.6 hrs. | 36/12 inch-lbs. |

EXAMPLE 4

Adhesive and sealant formulations were prepared similar to those of Example 1, except using as the accelerator each of 1-benzoyl-2-phenyl hydrazine and 1,1,1-trifluoro-acetyl-2-phenyl hydrazine. In each case, adhesive compositions were produced having good stability and accelerated cure speed.

EXAMPLE 5

Adhesive and sealant compositions are prepared similar to those of Example 1, except using as the acrylate monomer any of polyethyleneglycol dimethacrylate, ethoxylated bis-phenol-A dimethacrylate, trimethylolpropane trimethacrylate and tetrahydrofurfuryl methacrylate. The adhesive compositions produced have good stability and accelerated cure speed.

What is claimed is:

1. A curable adhesive and sealant composition comprising a room temperature polymerizable acrylate ester, a free radical initiator in an amount sufficient to initiate polymerization of said ester and, as a polymerization accelerator, a compound having the formula

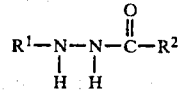

wherein $R^1$ is selected from the group consisting of alkyl from ethyl to 6 carbon atoms, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl, amino, and the following groups:

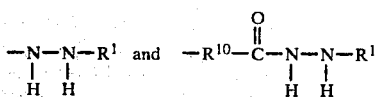

wherein $R^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature.

2. A composition of claim 1 wherein $R^1$ is selected from the group consisting of alkyl from ethyl to 6 carbon atoms, aryl and aralkyl.

3. A composition of claim 1 wherein $R^2$ is selected from the group consisting of hydrogen, alkyl, aryl and alkoxy.

4. A composition of claim 3 wherein $R^2$ is selected from the group consisting of hydrogen and alkyl.

5. A composition of claim 1 wherein the initiator is a hydroperoxide or a perester.

6. A composition of claim 5 wherein the hydroperoxide is cumene hydroperoxide.

7. A composition of claim 5 containing a co-accelerator selected from the group consisting of amines and imides.

8. A composition of claim 7 wherein the imide is benzoic sulfimide.

9. A composition of claim 1 wherein the ester has the formula

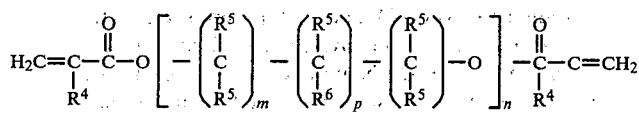

wherein $R^5$ represents a radical selected from the group consisting of hydrogen, lower alkyl of from 1 to about 4 carbon atoms, hydroxy alkyl of from 1 to about 4 carbon atoms, and

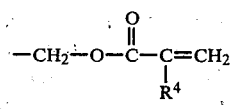

$R^4$ is a radical selected from the group consisting of hydrogen, halogen, and lower alkyl of from 1 to about 4 carbon atoms; $R^6$ is a radical selected from the group consisting of hydrogen, hydroxyl, and

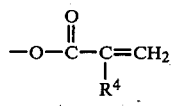

m is an integer equal to at least 1; n is an integer equal to at least 1; and p is 0 or 1.

10. A composition of claim 1 wherein the ester has the formula

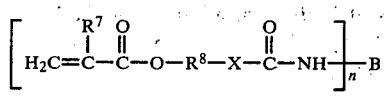

wherein n is an integer from 2 to about 6; B is a polyvalent organic radical selected from the group consisting of alkyl, alkenyl, cycloalkyl, cycloalkenyl, aryl, aralkyl, alkaryl and heterocyclic radicals both substituted and unsubstituted; $R^7$ is selected from the class consisting of hydrogen, chlorine and methyl and ethyl radicals; and $R^8$ is a divalent organic radical selected from the group consisting of lower alkylene of 1 through 8 carbon atoms, phenylene and naphthylene; and X is selected from the group consisting of —O— and

wherein $R^9$ is selected from the group consisting of hydrogen and lower alkyl of 1 through 7 carbon atoms.

11. A curable anaerobic adhesive and sealant composition comprising a room temperature polymerizable acrylate ester, a peroxy initiator in an amount sufficient to initiate polymerization of said ester upon substantial exclusion of oxygen, a quinone inhibitor in an amount sufficient to prevent premature polymerization and, as a polymerization accelerator, a compound having the formula

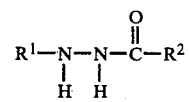

wherein $R^1$ is selected from the group consisting of alkyl from ethyl to 6 carbon atoms, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl, amino, and the following groups:

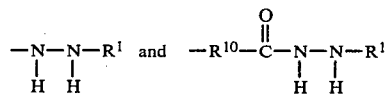

wherein $R^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature.

12. A composition of claim 11 wherein the initiator is a hydroperoxide.

13. A composition of claim 12 wherein the hydroperoxide is cumene hydroperoxide.

14. A composition of claim 11 wherein the inhibitor is naphthoquinone.

15. A composition of claim 11 containing a co-accelerator selected from the group consisting of amines and imides.

16. A composition of claim 15 wherein the imide is benzoic sulfimide.

* * * * *

UNITED STATES PATENT OFFICE
CERTIFICATE OF CORRECTION

Patent No. 4,321,349  Dated  March 23, 1982

Inventor(s) Richard D. Rich

It is certified that error appears in the above-identified patent and that said Letters Patent are hereby corrected as shown below:

Column 6, Line 58: Delete the word "reactions" and insert "reactants".

Signed and Sealed this

Twenty-sixth Day of October 1982

[SEAL]

Attest:

Attesting Officer

GERALD J. MOSSINGHOFF

Commissioner of Patents and Trademarks